United States Patent [19]

Boyer

[11] Patent Number: 4,622,380
[45] Date of Patent: Nov. 11, 1986

[54] ALKYLIDENE BROMO-SUBSTITUTED ARYLENE ACETAL AND/OR KETAL POLYMERS

[75] Inventor: Nicodemus E. Boyer, Schaumburg, Ill.

[73] Assignee: PPG Industries, Inc., Pittsburgh, Pa.

[21] Appl. No.: 746,805

[22] Filed: Jun. 20, 1985

[51] Int. Cl.$^4$ ............................................. C08G 65/38
[52] U.S. Cl. .................... 528/219; 525/391; 525/398; 528/220; 528/230
[58] Field of Search ...................... 528/219, 220, 230; 525/391, 398

[56] References Cited

U.S. PATENT DOCUMENTS

| | | | |
|---|---|---|---|
| 3,069,386 | 12/1962 | Barclay | 528/219 X |
| 4,220,733 | 9/1980 | Jones | 525/66 |
| 4,258,175 | 3/1981 | Chen | 528/217 |
| 4,340,696 | 7/1982 | White et al. | 528/219 X |
| 4,345,050 | 8/1982 | Loucks | 528/219 X |
| 4,345,051 | 8/1982 | Loucks | 528/219 X |
| 4,371,709 | 2/1983 | Steffen et al. | 568/33 |
| 4,489,189 | 12/1984 | Boyer | 524/409 |

FOREIGN PATENT DOCUMENTS 6032825 4/1983 Japan.

*Primary Examiner*—Lucille M. Phynes
*Attorney, Agent, or Firm*—George D. Morris

[57] ABSTRACT

Alkylidene bromo-substituted arylene acetal and/or ketal polymers are useful for imparting fire resistance to compositions containing flammable polymers.

22 Claims, No Drawings

ALKYLIDENE BROMO-SUBSTITUTED ARYLENE ACETAL AND/OR KETAL POLYMERS

The present invention provides polymers which are fire retardant and which are especially useful when in admixture with one or more other polymers. Accordingly, one aspect of the present invention is acetal and/or ketal polymer diagrammatically represented by the formula

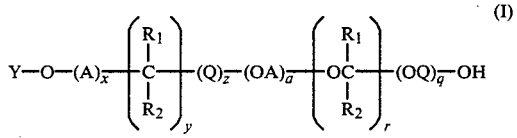

wherein a. each A is individually a divalent aromatic group containing either one aromatic ring substituted by at least two bromo groups or two aromatic rings which are either joined together or separated by an atom, each of said rings being substituted by at least two bromo groups, b. each $R_1$ is individually hydrogen, unsubstituted alkyl, substituted alkyl, unsubstituted phenyl, or substituted phenyl, c. each $R_2$ is individually hydrogen, unsubstituted alkyl, substituted alkyl, unsubstituted phenyl, or substituted phenyl, d. each Q is individually a divalent organo group other than A having at least two carbon atoms between the two valences thereof, e. Y of each molecule of the polymer is bromo-substituted monovalent organo group, f. the average value of each of x, y and z is in the range of from 0 to 1, g. the sum of the average values of a and x is in the range of from 2 to about 30, h. the sum of the average values of r and y is in the range of from 1 to about 30, i. the sum of the average values of q and z is in the range of from 0 to about 20, provided that j. the sum of the average values of x, y and z is 1, k. the sum of the average values of a and x is greater than the sum of the average values of r and y, and l. the sum of the average values of a and x is greater than or equal to the sum of the average values of q and z.

Formula I is diagrammatic, and it is not intended to imply that the three right-most parenthetical portions are necessarily blocks, although blocks may be used where desired. In many cases the polymer is more or less random, especially when more than a few mer units are employed and when mixtures are used for one or more types of reactant in the acetal and/or ketal-forming reaction. In those instances where more than a few mer units are used and it is desired to form blocks, prepolymers are typically first formed and these are then joined in an acetal and/or ketal-forming reaction. By the judicious choice of reactants, acetal and/or ketal polymer having an alternating structure or blocks of alternating structure may be formed.

Although the values of a, r and q will each be an integer for any particular compound, the average values of these quantities for mixtures of compounds may be whole or fractional numbers consistent with the ranges and provisions indicated above. Similarly, one of x, y and z will be one and the others will be zero for any particular compound, but the average values of these quantities for mixtures of compounds within Formula I may be whole or fractional numbers in the ranges stated above, provided their sum is unity. In other words, while the three left-most parenthetical portions of Formula I are especially convenient for representing mixtures of compounds, they are represented diagrammatically and in no individual compound will these portions be connected directly together.

The average values of a, r, q, x, y and z may be ascertained from analytical information, knowledge of the structures of the reactants, knowledge of the proportions of reactants, knowledge of the reaction mechanism, knowledge of the reaction procedure, or various combinations of these. When an average molecular weight of the composition is used in the determination, the number average molecular weight should be employed.

The various bromine-substituted divalent aromatic groups which may be used for each A in the molecule may be the same, they may be different or some may be the same and different from others. The identities of useful bromine-substituted divalent aromatic groups are widely varied. Examples include tetrabromo-1,2-phenylene, 4,5,6-tribromo-1,3-phenylene, tetrabromo-1,3-phenylene, 2,6-dibromo-1,4-phenylene, 2,3,6-tribromo-1,4-phenylene, tetrabromo-1,4-phenylene, [3,3',5,5'-tetrabromo-1,1'-biphenyl]-4,4'-diyl, [octabromo-1,1'-biphenyl]-4,4'-diyl, methylene-bis(2,6-dibromo-4,1-phenylene), methylenebis(2,3,6-tribromo-4,1-phenylene), methylenebis(tetrabromo-4,1-phenylene), ethylidenebis(tetrabromo-4,1-phenylene), (2-bromoethylidene)bis(2,6-dibromo-4,1-phenylene), (1-methylethylidene)bis(2,6-dibromo-4,1-phenylene), (1-dibromomethyl-2,2-dibromoethylidene)bis(2,6-dibromo-4,1-phenylene), (2,2-dichloroethenylidene)-bis(2,6-dibromo-4,1-phenylene), oxybis(2,6-dibromo-4,1-phenylene), oxybis(tetrabromo-4,1-phenylene), thiobis(2,6-dibromo-4,1-phenylene), thiobis(tetrabromo-4,1-phenylene), sulfinylbis(2,6-dibromo-4,1-phenylene) and sulfonylbis(2,6-dibromo-4,1-phenylene).

Similarly, the various monovalent groups which may be used for each $R_1$ in the molecule and for each $R_2$ in the molecule may be the same, they may be different, or some may be the same and different from others. The identities of alkyl groups which may be used for $R_1$ or $R_2$ or both $R_1$ and $R_2$ may be widely varied. Each may be straight chain or it may be branched. Each may be unsubstituted or substituted. Generally, each alkyl group, whether substituted or unsubstituted, contains from 1 to about 6 carbon atoms. Often each contains from 1 to about 4 carbon atoms. When the alkyl group is unsubstituted, methyl or ethyl is preferred while methyl is especially preferred. When the alkyl group is substituted, it preferably contains 1 or 2 carbon atoms; substituted alkyl containing one carbon atom is particularly preferred. The phenyl group which may be used for each $R_1$ or $R_2$ or both $R_1$ and $R_2$ may be unsubstituted or substituted.

When the alkyl groups or the phenyl groups are substituted, the nature and numbers of substituents are such that they do not render the ether polymer unsuitable for its intended purpose. When a plurality of substituents are used, they may be the same or all or a portion of them may be different. Ordinarily minor substituents such as halo, nitro, lower carbalkoxy, lower acyl, lower dialkylamino, and lower hydroxyalkyl are used. Lower alkyl and halogenated lower alkyl may also be used as some or all of the substituents on the substituted phenyl group. Halo groups are the preferred substituents. Of these, chloro and bromo are preferred, while bromo is especially preferred.

Examples of groups which may be used for $R_1$ and $R_2$ include hydrogen, methyl, ethyl, propyl, isopropyl, butyl, isobutyl, secondary butyl, tertiary butyl, pentyl, hexyl, chloromethyl, dichloromethyl, trichloromethyl, 1,2-dichloroethyl, bromomethyl, dibromomethyl, tribromomethyl, 1,2-dibromomethyl, chlorodibromomethyl, phenyl, o-methylphenyl, m-methylphenyl, p-methylphenyl, p-ethylphenyl, o-bromophenyl, p-bromophenyl, dibromophenyl, and tribromophenyl. Hydrogen and methyl are preferred. It is particularly preferred that $R_1$ and $R_2$ are each hydrogen.

In some instances it may be desired to include in minor amount in the polymer molecule one or more divalent organo groups other than those represented by A of Formula I. Accordingly, the divalent organo groups which may be used for Q may be widely varied. Each may be substituted or unsubstituted. All of the divalent organo groups used for Q in the molecule may be the same, they may be different, or some may be the same and different from the others. Typically the divalent organo groups used each contain from about 2 to about 30 carbon atoms. From about 2 to about 15 carbon atoms is preferred.

In one embodiment, the divalent organo groups used for Q may be the divalent aromatic groups discussed with respect to A except the single aromatic ring is not substituted by at least two bromo groups or either or both of the aromatic rings of the two-ring group do not possess at least two bromine atoms. Examples of such divalent organo groups include those given for A, but without the requisite bromo substitution, as for example, 1,2-phenylene, 1,3-phenylene, and 1,4-phenylene.

In another embodiment, the divalent organo groups employed for Q may be divalent aromatic groups containing three or more aromatic rings. Examples include (phenylmethylene)bis(4,1-phenylene), (2-chlorophenylmethylene)-bis(4,1-phenylene), (2,4-dichlorophenylmethylene)bis-(4,1-phenylene), [4,1-(methylethyl)phenylmethylene]bis(4,1-phenylene), (1-naphthalenylmethylene)bis-4,1-(phenylene), (1-phenylethylidene)bis(4,1-phenylene), [1-(4-chlorophenyl)ethylidene]bis(4,1-phenylene), [1-(2,5-dichlorophenyl)-ethylidene]bis(4,1-phenylene), [1-(2,5-dibromophenyl)ethylidene]bis(4,1-phenylene), [1-(3,4-dichlorophenyl)ethylidene]bis(4,1-phenylene), [1-(2-naphthalenyl)ethylidene]bis(4,1-phenylene), (diphenylmethylene)bis(4,1-phenylene) and (1,1′-biphenyl-4,4′-diyl)bis-(oxy-4,1-phenylene).

In another embodiment the divalent organo groups used for Q are divalent aliphatic groups. Ordinarily, the divalent aliphatic groups employed each contain from 2 to about 6 carbon atoms; from 2 to about 4 carbon atoms is preferred. Examples of satisfactory divalent aliphatic groups include 1,2-ethanediyl, 1,3-propanediyl, 1-methyl-1,2-ethanediyl, 1,4-butanediyl, 1,5-pentanediyl, oxybis(2,1-ethanediyl), 2,2-dimethyl-1,3-propanediyl, 2,2-bis(chloromethyl)-1,3-propanediyl, 2,2-bis(bromomethyl)-1,3-propanediyl, 1,7-heptanediyl and 1,8-octanediyl.

In yet another embodiment, the divalent organo groups employed for Q may be used to introduce divalent linkage of various types such as for example, ester, carbonate, amide, urethane or urea linkages, to the molecule. Divalent organo groups containing one or more than one type of such divalent linkage may be used as desired. Examples of divalent organo groups which may be used for Q include (carbonyloxy)bis(2,1-ethanediyl), (carbonyldiimino)-bis(methylene), (2,3,4,5-tetrahydro-2-oxy-1H-imidazol-1,3-diyl)bis(methylene), methylenebis(4,1-cyclohexanediyl-N-carbamyl-2,1-ethanediyl), and (6-methyl-1,4-phenylene)bis(N-aminocarbonyl-2,1-ethanediyl). Still others include those derived from polyester oligomers, polyamide oligomers, polyurethane oligomers, polyurea oligomers and poly(urethane-urea) oligomers, as for instance, 4,8-dioxo-3,7-dioxadecane-1,10-diyl.

The terminal group Y for any individual polymer molecule may be any of a wide variety of bromo-substituted monovalent organo groups. In mixtures of polymer molecules, the various terminal groups represented by Y may be the same or they may be different. Examples of bromo-substituted monovalent organo terminal groups that may be used include bromo-substituted, alkyl, bromo-substituted alpha,beta-saturated alkenyl, bromo-substituted aralkyl, bromo-substituted (cycloalkyl)alkyl, bromo-substituted cycloalkyl, bromo-substituted aryl, bromo-substituted alkoxyalkyl and bromo-substituted aryloxyalkyl. When bromo-substituted alkyl is employed, it usually has from 1 to about 20 carbon atoms, often from 1 to about 10 carbon atoms. Bromo-substituted lower alkyl having from 1 to about 4 carbon atoms is preferred. Bromo-substituted methyl and bromo-substituted ethyl are especially preferred. The bromo-substituted alpha,beta-saturated alkenyl used generally has from 3 to about 10 carbon atoms. When bromo-substituted aralkyl is employed, the aryl portion generally contains from 6 to about 10 carbon atoms and the alkyl portion usually contains from 1 to about 10 carbon atoms; bromo-substituted benzyl is preferred. When bromo-substituted (cycloalkyl)alkyl is used, the cycloalkyl portion generally contains from about 6 to about 8 carbon atoms and the alkyl portion typically contains from 1 to about 10 carbon atoms; bromo-substituted cyclohexylmethyl is preferred. The bromo-substituted cycloalkyl typically has from about 6 to about 8 carbon atoms; bromo-substituted cyclohexyl is preferred. The bromo-substituted aryl usually has from 6 to about 10 carbon atoms; bromo-substituted 1-naphthyl, bromo-substituted 2-naphthyl, and bromo-substituted phenyl are preferred. When bromo-substituted alkoxyalkyl is employed the alkoxy portion usually contains from 1 to about 4 carbon atoms and the alkyl portion usually contains from 1 to about 10 carbon atoms. When bromo-substituted aryloxyalkyl is used, the aryloxy portion generally contains from about 6 to about 10 carbon atoms and the alkyl portion typically contains from 1 to about 10 carbon atoms. Those groups having one or more rings are usually homocyclic, but one or more hetero atoms may be present so long as they do not render the acetal and/or ketal polymer unsuitable for its intended purpose. The aliphatic groups and the aliphatic portions of hybrid groups such as bromo-substituted aralkyl may be straight or branched, but it is preferred they be straight.

The bromo-substituted monovalent organo group used for Y may be substituted with one or more other substituents which do not render the acetal and/or ketal polymer unsuitable for its intended purpose. The especially preferred terminal groups are pentabromophenyl, 2,4,6-tribromophenyl, 2-methyl-3,4,5,6-tetrabromophenyl, 3-methyl-2,4,5,6-tetrabromophenyl, and 4-methyl-2,3,5,6-tetrabromophenyl. Others of particular interest include tetrabromo-1-naphthyl, pentabromo-1-naphthyl, hexabromo-1-naphthyl, tetrabromo-2-naphthyl, pentabromo-2-naphthyl, and hexabromo-2-naphthyl.

In Formula I, the sum of the average values of a and x is preferably in the range of from 2 to about 30, the sum of the average values of r and y is preferably in the range of from 1 to about 30, and the sum of the average values of q and z is preferably in the range of from 0 to about 5, subject to the provisions heretofore stated. In another preferred embodiment the sum of the average values of a and x is in the range of from 2 to about 6, the sum of the average values of r and y is in the range of from 1 to about 6 and the sum of the average values of q and z is in the range of from 0 to about 6, subject to the provisions heretofore stated. It is particularly preferred that the sum of the average values of q and z in Formula I be essentially zero.

The number average molecular weights of the acetal and/or ketal polymers of the invention may vary widely within the range provided by Formula I. Usually, however, the number average molecular weight is in the range of from about 1000 to about 30,000. From about 1000 to about 10,000 is preferred.

The acetal and/or ketal polymers of the invention may be prepared by many methods. Usually they are prepared by reacting alkali metal salts of one or more hydroxy-functional compounds with one or more alkylidene dihalides. Ordinarily the reaction is carried out in the liquid phase.

In the exemplary methods described below, A, $R_1$, $R_2$, Q, Y, x, y, z, a, r, and q are as discussed above with respect to Formula I. Only one compound or mixtures of compounds within any of the formulae below may be used as desired.

According to one method, alkali metal salts of bishydroxy compounds represented by the formula

  (II)

one or more of a wide variety of compounds represented by the formula

  (III)

where M and Y are as heretofore described, and, when used,

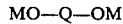  (IV)

where M is an alkali metal group, a monovalent fractional part of an alkaline earth metal group, an ammonium group, or a substituted ammonium group, are reacted with alkylidene dihalide represented by the formula

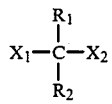  (V)

where $X_1$ and $X_2$ are each independently halo, to form acetal and/or ketal polymer. Usually $X_1$ and $X_2$ are each independently chloro or bromo. The compound or compounds represented by Formula III are included with the compounds of Formula II and, when used, the compounds of Formula IV.

Examples of alkylidene dihalides that may be employed include dichloromethane (viz., methylene chloride), dibromomethane (viz., methylene bromide), bromochloromethane, 1,1-dichloroethane, 1,1-dibromoethane, 1,1-dichloropropane, 1,1-dichlorobutane, 1,1-dichloro-2-methylpropane, 1,1-dibromopentane, 1,1-dichloro-2-methylbutane, 1,1-dichloro-3-methylbutane, 1,1-dichloro-2,2-dimethylpropane, 1,1-dichlorohexane, 2,2-dichloropropane, 2,2-dichlorobutane, 2,2-dichloropentane, 2,2-dichloro-3-methylpropane, 2,2-dibromohexane, 2,2-dichloro-3-methylpentane, 2,2-dichloro-4-methylpentane, 2,2-dichloroheptane, 3,3-dichloropentane, 3,3-dichlorohexane, 4,4-dichloroheptane, 4,4-dibromooctane, 4,4-dichloro-2,6-dimethylheptane, 4,4-dichloro-3-ethylheptane, 5,5-dichlorononane, 5,5-dichlorodecane, 7,7-dichlorotridecane, α,α-dichloromethylbenzene, α,α-dichloroethylbenzene, α,α-dichloromethyl-4-methylbenzene, and dichlorodiphenylmethane. Only one alkylidene dihalide or a mixture of alkylidene dihalides may be used as desired.

Ordinarily, the reactants are employed in about stoichiometric amounts although excesses of some of the reactants may be used.

When salt of the bishydroxy compound is used in large excess, terminal M-groups may be replaced with hydrogen groups by acidification. When the salt is used in slight excess, M-group termination is not ordinarily found in the product polymer; although it is not desired to be bound by any theory, it is believed that hydrolysis occurs in the precipitation process which replaces M-groups with hydrogen.

When alkylidene dihalide is used in excess termination of the type—OC($R_1R_2$)X, where X is halogen, is not ordinarily found in the product polymer. Rather, hydroxyl termination is observed. The reason for this is not known, but evidently —OC($R_1R_2$)X termination is either unstable or does not form.

Usually the equvalent ratio of alkylidene dihalide to the salts is in the range of from about 0.5:1 to about 20:1; from about 0.9:1 to about 1.1:1 is preferred.

When used, the equivalent ratio of the salt of Formula IV to the salt of Formula II is in the range of from about 0.01:1 to about 0.99:1; from about 0.05:1 to about 0.2:1 is preferred.

The equivalent ratio of the salt of Formula III to the salt of Formula II is in the range of from about 0.01:1 to about 1:1; from about 0.05:1 to about 0.3:1 is preferred.

The reaction temperature may be widely varied. Reaction of the salts of Formula II and Formula III (and when used that of Formula IV) with alkylidene dihalides is ordinarily accomplished using temperatures in the range of from about 0° C. to about 200° C.; from about 35° C. to about 180° C. is preferred.

The reaction is ordinarily conducted at or near ambient pressure, although greater or lesser pressures may be used when desired.

The reaction is usually, but not necessarily conducted in the presence of inert organic solvent. Examples of suitable inert organic solvents include aliphatic diols such as ethylene glycol, propylene glycol, diethylene glycol, dipropylene glycol, poly(ethylene oxide) and poly(propylene oxide), both latter hydroxyl-terminated; organic ethers, such as diethyl ether, di-n-propyl ether, bis(2-methoxyethyl)ether, bis(2-ethoxyethyl)ether, bis-(ethoxyethoxyethyl)ether, 2-hydroxyethyl ethyl ether, 2-methoxyethyl ethyl ether, ethyl phenyl ether, diphenyl ether, and bis(4-ethoxyphenyl)ether; alkyl or aryl terminated poly(alkylene oxides), such as poly(ethylene oxide) and poly(propylene oxide); inert hydrocarbons, preferably inert alkylaromatic hydrocarbons, such as toluene, xylenes, chlorobenzene, bromobenzene, o-dichlorobenzene, and other halogenated aromatic hydrocarbons; halogenated alkylaromatic hydrocarbons, such as chlorotoluenes and chloroxylenes; and mixtures of the above exemplified inert solvents as well as other inert solvents. An excess of a liquid dihaloalkane serving as one of the reactants, e.g., dichloromethane, dichloromethane, or 2,2-dichloropropane, also can serve as a solvent. It has been shown that, especially in the case that the products are poly(haloarylene formals), some water can be contained in the hydrophilic solvents, e.g., in ethylene glycol, either present initially or formed from water-containing or water-generating reactants. Thus, it has been shown that it is not essentially detrimental to the yields of the poly(haloarylene formals) if the water initially present in commercial potassium hydroxide or sodium hydroxide (used to form the organic alkali salts in the reactions) is introduced into the reaction mixture, or if the water formed from reactions of potassium hydroxide and sodium hydroxide and halogenated diols (such as water formed from 1 molecule of tetrabromobisphenol A and 2 molecules of potassium hydroxide or sodium hydroxide) is not removed by distillation before addition of the dihaloalkane, but is left in the reaction medium. This discovery that relatively small amounts of water present in the solvents initially or introduced later with some reactants is not detrimental to the yields of polyformals has a significant practical value in the synthesis of the products of this invention, in particular, of poly(haloarylene formals), which are less sensitive to hydrolysis even at high reaction temperatures than the other poly(haloarylene acetals) and poly(haloarylene ketals).

Preferred solvents include aliphatic diols such as ethylene glycol and propylene glycol and their mixtures with alkyaromatic solvents such as toluene and xylenes.

The reaction mixtures may also contain compounds for complexing alkali ions, such as crown ethers, for example, 18-crown-6, as well as other compounds useful in phase transfer catalysis of reactions of two liquid phases or of a solid phase with one or two liquid phases (for example, the solid phase being the polymeric product of this invention, and the liquid phases containing the reactants dissolved in ethylene glycol and in toluene). Examples of such phase transfer catalysts include phosphonium salts and phosphonium hydroxyl compounds such as triphenylbenzylphosphonium chloride and triphenylbenzylphosphonium hydroxide; as well as organic or inorganic ammonium salts and ammonium hydroxides, such as ammonium bromide, trimethylbenzylammonium chloride, trimethylbenzylammonium hydroxide, and ammonium hydroxide.

While the presence of crown ethers and/or phase transfer agents may in some instances increase the reaction rates and facilitate the completion of reactions, it has been shown in several examples that for some of the most practical products in the sense of least expensive raw materials, high yields, and high fire retardant effects in flammable polymers, such as for the synthesis of poly(tetrabromobisphenol A formal), the presence of crown ethers and phase transfer agents is not needed for high yields in reasonably short periods of reaction time. This observation demonstrated in several examples is also important for practical applications, i.e., for an inexpensive procedure of manufacture of the products of this invention.

The weight ratio of inert solvent to the reactants ultimately employed is subject to wide variation. Generally, the amount of solvent should be sufficient to at least partially dissolve the reactants at the reaction temperature. The weight ratio of inert solvent to the reactants ultimately employed is usually in the range of from about 0.1:1 to about 20:1. From about 0.3:1 to about 5:1 is preferred.

It is expected that the acetal and/or ketal polymers of the invention may also be prepared by reacting bishydroxy compounds represented by the formula

HO—A—OH        (VI)

monohydroxy-functional compounds represented by the formula

Y—OH        (VII)

where Y is as heretofore described, and, when used,

HO—Q—OH        (VIII)

with acetals and/or ketals represented by the formula

$$R_3O-\underset{\underset{R_2}{|}}{\overset{\overset{R_1}{|}}{C}}-OR_4 \qquad (IX)$$

where $R_1$ and $R_2$ are as described above and $R_3$ and $R_4$ are each independently alkyl containing from 1 to about 10 carbon atoms. Ordinarily $R_3$ and $R_4$ are each independently methyl, ethyl, propyl, isopropyl, butyl, or tertiary butyl. The, monohydroxy-functional compounds represented by the formula VII are included with the diols prior to reaction with acetal and/or ketal.

In practicing this method, it is expected that A, Q, $R_1$ and/or $R_2$ may be substituted with halogen or with other substituents that do not preclude formation of acetal and/or ketal polymer.

In some instances the volatility of the acetal and/or ketal may be so low that it distills from the reaction mixture at temperatures below the reaction temperature. It is expected, in such cases, that reaction will proceed if a less volatile acetal and/or ketal is used or if the reaction is conducted under superatmospheric pressure.

Examples of acetals that may be used include dimethoxymethane, diethoxymethane, di-n-propoxymethane, di-n-butoxymethane, 1,1-diethoxyethane, 1,1-diisopropoxyethane, 1,1-di-n-propoxyethane, 1,1-diethoxypropane, 1,1-diethoxybutane, 1,1-diethoxy-2-methylpropane, 1,1-dimethoxypentane, 1,1-diethoxy-2-methylbutane, 1,1-dimethoxy-3-methylbutane, 1,1-diethoxy-2,2-dimethylpropane, 1,1-diethoxyhexane, and α,α-dimethoxymethylbenzene. Examples of ketals that may be employed include 2,2-dimethoxypropane, 2,2-diethoxypropane, 2,2-dipropoxypropane, 2,2-di-n-butoxypropane, 1,3-dibromo-2,2-dimethoxypropane, 1,3-dibromo-2,2-diethoxypropane, 2,2-dimethoxybutane, 2,2-diethoxypentane, 2,2-diethoxy-3-methylpropane, 2,2-dimethoxyhexane, 2,2-dimethoxy-3-methylpropane, 2,2-diethoxy-4-methylpropane, 2,2-di-n-butoxybutane, 2,2-diethoxyheptane, 3,3-dimethoxypentane, 3,3-dimethoxyhexane, 4,4-dimethoxyheptane, 4,4-dimethoxyoctane, 4,4-diethoxy-2,6-dimethylheptane, 4,4-dimethoxy-3-ethylheptane, 4,4-diethoxynonane, 5,5-dimethoxydecane, 7,7-dimethoxytridecane, α,α-dimethoxyethylbenzene, α,α-dimethoxy-1-ethyl-4-chlorobenzene, and diethoxydiphenylmethane. Only one compound of the class of acetals and ketals, or a mixture of such compounds may be used as desired. The identities of the terminal groups of the acetal and/or ketal polymer will be influenced by whether a stoichiometric amount, a deficiency, or an excess of the acetal and/or ketal is employed. In many cases, the reaction does not proceed to completion and the polymer will contain molecules terminated in various ways with hydrogen and monovalent organo groups. In those instances where the reaction does proceed to completion, the terminal groups will be primarily those of the reactant in excess; for this reason, at least a small deficiency of the acetal and/or ketal is preferred when the reaction proceeds to completion. When both terminal groups are hydrogen, one of the terminal hydrogen groups is replaced with bromo-substituted monovalent groups through reaction with any of a wide variety of compounds which are reactive with hydroxyl groups. Examples of such compounds include bromo-substituted carboxylic acids, bromo-substituted carboxylic acid anhydrides, bromo-substituted acid halides, bromo-substituted isocyanates and bromo-substituted haloformates.

There are many variations that may be employed with any of the general methods described above. For example, block polymers may be formed by reacting differing prepolymers having coreactive terminal groups. In another variation, one or more prepolymers may be joined by a difunctional reactant to form block or alternating polymers. Depending upon the details of the procedure employed, the acetal and/or ketal polymer may contain random polymer, alternating polymer, or blocks; or it may contain various combinations of these.

The acetal and/or ketal polymers of the invention may be incorporated with flammable polymer to provide a composition having greater fire resistance than that of the flammable polymer. The individual acetal and/or ketal polymers of the invention will be more effective with some flammable polymers than with others, but the desired effect can be obtained by proper adjustment of the fire resistant acetal and/or ketal polymer concentration in the composition. Usually the flammable polymer is thermoplastic, but it may be thermosetting. The flammable polymer may be a homopolymer, an interpolymer or a mixture of polymers. Examples of flammable polymers in which the fire resistant polymer of the invention may be used include acrylonitrile-butadiene-styrene interpolymer or graft polymer, polystyrene, high density polyethylene, low density polyethylene, crosslinked polyethylene, polypropylene, polyesters, polycarbonates, and polyamides. The preferred polymers are acrylonitrile-butadiene-styrene interpolymer or graft polymer, high impact polystryrene, high density polyethylene, and polyamide.

The amount of the fire resistant acetal and/or ketal polymer which is present in compositions of the invention is subject to wide variation. Such fire resistant acetal and/or ketal polymer is ordinarily present in an amount in the range of from about 1 percent to about 50 percent by weight of the total polymeric content of the composition. From about 5 percent to about 30 percent by weight is preferred. Mixtures of fire resistant acetal and/or ketal polymers may be used.

One or more other materials which increase fire resistance may optionally also be present in the composition. Examples of such materials include zinc oxide, zinc borate, boric acid, borax, ferric oxide, antimony trioxide and antimony pentoxide. Antimony trioxide is preferred. Mixtures may be employed where desired. The amounts of these materials are also subject to wide variation. When used, they are usually present in the composition of the invention in an amount in the range of from about 0.1 to about 20 percent by weight. An amount in the range of from about 1 percent to about 10 percent by weight is preferred.

The compositions of the invention may optionally contain plasticizers, pigments, dyes, tints, resinous pigment dispersants or grinding vehicles, and the like.

The listing of optional ingredients discussed above is by no means exhaustive. These and other ingredients may be employed in their customary amounts for their customary purposes so long as they do not seriously interfere with good polymer formulating practice.

The composition of the invention are usually prepared by simply admixing the various ingredients. This may be accomplished in many instances by milling. If the flammable polymer and the fire resistant polymer are both soluble in solvent, they may be dissolved, mixed, and the polymer mixture recovered by removal of the solvent. Most often, the materials are admixed while the polymers are in the form of a melt.

The compositions of the invention have fire resistance characteristics and find many uses. Typically, they may be extruded into fibers, films or other shapes, or molded, shaped or formed into substantially any form. Where the polymers of the composition are soluble in solvent or are dispersible in liquid nonsolvents such as water, organic nonsolvent or miscible systems of water and organic liquid, the composition may be employed in coating compositions.

In the illustrative examples which follow, all parts are parts by weight and all percentages are percentages by weight unless otherwise specified.

Examples I–V, which follow, described syntheses of poly(tetrabromobisphenol A formal) terminated by a hydroxyl group and by a 2,4,6-tribromophenoxy group.

EXAMPLE I

To each of two 2-liter 1-neck flasks were added at room temperature 271.95 g of 2,2-bis(3,5-dibromo-4-hydroxyphenyl)propane, 33.1 g of 2,4,6-tribromophenol, 600 ml of ethylene glycol, 100 ml of toluene, and 72.0 g of 85.7% potassium hydroxide pellets, for the total of 543.9 g (1.0 mole) of 2,2-bis(3,5-dibromo-4-hydroxyphenyl)propane, 66.2 g (0.2 mole) of 2,4,6-tribromophenol, 1200 ml of ethylene glycol, 200 ml of toluene, and 144.0 g of 85.7% potassium hydroxide, the latter containing 123.4 g of pure KOH and 20.6 g of water.

From each of the two flasks was removed by distillation at a reduced pressure on a flash evaporator about 100 ml of toluene and water. The residual liquid from both flasks was transferred to a 5-liter 4-neck flask equipped with an electric heating mantle, a residue thermometer, an addition funnel, a mechanical stirrer, a branched glass connecting tube topped by a vapor thermometer, and a water-cooled reflux condenser connected to a drying tube containing anhydrous calcium sulfate (Drierite ®, W. A. Hammond Drierite ® Co.).

For a quantitative transfer, the interior of each of the two 2-liter flasks was washed with 100 ml of ethylene glycol preheated to 100° C., and the washings were also added to the 5-liter flask.

The transparent, honey-colored, clear liquid in the 5-liter flask was briefly heated up to 120° C., and at this temperature 2.6 g (0.01 mole) of 18-crown-6 was added. The temperature was held at 120° C. for 15 minutes, with no exotherm observed. Then a dropwise addition of 200.8 g (1.155 moles, or 5% molar excess) of dibromomethane was carried out from an addition funnel in two hours at the reaction temperature of 120° C. to 150° C., with external heating by means of an electric heating mantle, and with mechanical stirring. The reaction mixture was a white slurry.

After complete addition of dibromomethane, 100 ml of ethylene glycol was added to facilitate the stirring of the thick slurry. The mixture was heated, with stirring, to 150° C. for 2 hours, cooled in an ice bath to 70° C., and precipitated by pouring into two 4-liter beakers, each of which contained 2 liters of ice water.

The precipitated mixture was mixed until the ice melted and was filtered. The wet white solid on the filter had the mp. range of 285°–295° C. The white solid was mixed in a 4-liter beaker with 1.5 liters of methanol and refiltered; while still wet with methanol, the white solid weighed 1192.0 g. The methanolic filtrate was mixed with 1 liter of water, and since no precipitate was formed, the mixture was discarded.

The following drying observations were made for the white solid, in terms of net weight after each drying period:
Air-dried for 16 hours at 25° C.: 1007.4 g
Vacuum-dried for 4 hours at 120° C./2.7 kPa, absolute: 783.3 g
Vacuum-dried for a total of 8 hours as above: 680.8 g
Vacuum-dried for a total of 12 hours as above: 666.9 g At this stage of drying, the yield was 7% higher than the theoretical yield, indicating the presence of solvent. A sample of the white solid was analyzed for the presence of ethylene glycol and toluene by gas chromatography (GC). No toluene was found, but GC indicated the presence of 5.76% by weight of ethylene glycol (±0.05%).

In order to remove ethylene glycol, 665.6 g of the white powder was mixed in a 4-liter beaker with 3 liters of methanol and 80 ml of acetone and heated on a hot plate to the boiling point of the solvents, with magnetic stirring, and with the beaker covered by a watch glass, for 20 minutes. The mixture was cooled to 40° C. and filtered to recover 1235.0 g of the white solid when wet, and the first methanol-acetone filtrate was saved.

The white solid was replaced in the 4-liter beaker and heated as before for 20 minutes with 3 liters of methanol to the boiling point of the solvent. The mixture was filtered to recover 1110.5 g of the white solid when wet, and the second methanolic filtrate was also saved.

The following drying observations for the white solid were made after each drying period, in terms of net weight.
Vacuum-dried for 3.5 hours at 120° C./2.7 kPa, absolute: 737.0 g
Dried in an air oven for 16 hours at 77° C./1 atm, absolute: 572.7 g
Pulverized in a mortar and vacuum-dried for 7.5 hours at 150° C./2 kPa, absolute: 572.5 g A sample of the white powder, which was the principal product, was submitted for analyses. The analytical results, including the infrared (IR) and nuclear magnetic resonance (NMR) spectra, supported the structure of Formula X for the principal product, with the average degree of polymerization n=3 to 4 for the fraction soluble in polar organic solvents such as p-dioxane or dimethylsulfoxide, and with n=5 for the total sample. Thus, the principal product was shown to be poly(tetrabromobisphenol A formal) with a hydroxyl terminal group and with a 2,4,6-tribromophenoxy terminal group.

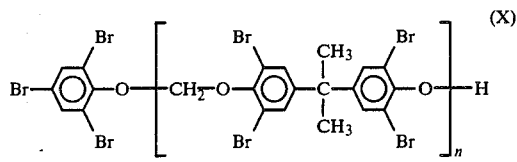

Calculated, for Formula XI (n=5) or $C_{86}H_{63}Br_{23}O_{11}$: molecular weight, 3110.363; Br, 59.09%.

Found: Br, 58.08%; 58.17%; average Br, 58.13%.

Based on the bromine content, the purity of the sample as Formula X (n=5) was 98.4%.

The sample was analyzed for the content of solvents by gas chromatography (GC). It was found to contain 0.13% by weight of ethylene glycol and 0.01% by weight of methanol.

By IR spectrum, %OH in the sample was found to be 0.21%.

By liquid chromatography (LC), the average molecular weight was determined for the fraction of the sample soluble in p-dioxane as follows: $M_N$, 1773; $M_W$, 2245; $M_Z$, 2736.

By thermogravimetric analysis (TGA), in a flowing nitrogen atmosphere at the heating rate of 10° C./minute, the percent weight loss was determined as follows: 5% at 364° C.; 10% at 380° C.; 20% at 390° C.; and 40% at 396° C.

By differential scanning calorimetry (DSC), the mp. of the principal product was at 218° C., and major decomposition was observed to start at 350° C.

The visual mp. range of the dry principal product, when heated in a glass capillary tube in an oil bath, was 282°–298° C. to a pale orange liquid.

Based on 1.0 mole of 2,2-bis(3,5-dibromo-4-hydroxyphenyl)propane, the theoretical yield was 622.1 g. The actual yield of the principal product was 572.5 g or 92.0%.

The first methanol-acetone filtrate from washing the principal product was mixed with 1.5 liters of water and filtered. The second methanol filtrate was also mixed with 1.5 liters of water and filtered. The solids obtained in these filtrations were joined as the second crop of the product of this Example I. It weighed 29.1 g when wet and 23.0 g after drying it to constant weight for 40 hours in an air oven at 83° C./1 atm, absolute. This secondary product was a beige powder, when pulverized in a mortar.

The total yield of solid, dried products in this Example I was 595.5 g or 95.7%.

EXAMPLE II

In Example II, the same materials in identical amounts were used as in Example I, and the same reaction procedure was followed. After completed reaction, the mixture was precipitated in 2.5 liters of ice water and filtered. The filtrate was discarded, and the white solid on the filter was mixed in a Waring blender with 2 liters of methanol and refiltered to yield a white solid. The methanolic filtrate was mixed with 1.5 liters of water and, since no appreciable amount of solids was formed, it was discarded. The white solid insoluble in methanol weighed 1050.2 g when wet. An air-dried sample had the mp. range of 280°–290° C. The following drying observations were made for the white solid, as to its net weight:

Vacuum-dried for 6 hours at 140° C./2.6 kPa, absolute: 877.0 g

Vacuum-dried for the total of 11 hours as above: 663.5 g

Vacuum-dried for the total of 14 hours as above: 616.7 g

Vacuum-dried for 5 hours at 150° C./2.6 kPa, absolute: 604.0 g

Vacuum-dried for 2 hours at 130° C./2.6 kPa, absolute: 600.4 g

At this stage of drying, the solid was a pale beige powder and the amount of ethylene glycol (reaction solvent) present was undetectable, or less than 0.02%, by gas chromatography (GC).

Next, 587.2 g of the pale beige powder was suspended in two 4-liter beakers in the total of 6 liters of methanol and 80 ml of ethanol, boiled for 1 hour on two hot plates, with magnetic stirring, and the mixtures were cooled to 40° C. and filtered. The white solid collected by filtration weighed 944.1 g. Its net weight was determined after the drying periods listed below as follows:

Vacuum-dried for 2 hours at 120° C./2.6 kPa, absolute: 758.0 g

Air-dried for 16 hours at 77° C./1 atm, absolute: 552.4 g

Vacuum-dried for 7.5 hours at 150° C./2 kPa, absolute: 552.7 g

This product of Example II was identified as having the structure of Formula X, with the average degree of polymerization n=5, by means of IR and NMR spectra and other analytical results listed in Table 1 below. The percent yield of the product was 88.8%.

EXAMPLE III

In Example III, the same materials in identical amounts were used as in Example I, except that 98.1 g (1.155 moles) of dichloromethane was employed instead of 200.8 g (1.155 moles) of dibromomethane. The reaction procedure was also the same in this Example III as in Example I, and very similar observations were made. The addition of dichloromethane to the ethylene glycol solution of the dipotassium salt of 2,2-bis(3,5-dibromo-4-hydroxyphenyl)-propane and the potassium salt of 2,4,6-tribromophenol, with small amounts of toluene and 18-crown-6 also present, was completed in 1 hour and 45 minutes at 150° C. After cooling to room temperature overnight, the mixture was heated to 160° C. for 2 hours, cooled to 30° C. with an ice bath, and precipitated in two 4-liter beakers, each containing 2 liters of ice water. After mixing thoroughly, the pH was 7.5. The mixtures were filtered jointly, and the pale beige solid on the filter was mixed with 1 liter of methanol in a Waring blender for 2 minutes and was again collected by filtration. The solid had mp. 255°–280° C.

The solid on the filter was divided into two approximately equal portions and each half was heated for 1 hour with 2 liters of methanol in a 4-liter beaker on a hot plate, with magnetic stirring, to the boiling point of methanol. The two beakers were cooled in an ice bath to room temperature, and the solid was recovered by filtration.

When wet, the solid weighed 852.6 g; after drying in an air oven to 105° C./1 atm, absolute, for 88 hours, 550.8 g. after pulverizing in a mortar, the final yield of the product, a pale beige powder, was 550.7 g; mp. 250°–275° C. to a pale orange, clear liquid.

This product of Example III was identified as having the structure of Formula X with the average degree of polymerization n=5, by means of IR and NMR spectra and other analytical results listed in Table 1, below. Based on this identification and the theoretical yield of 622.1 g, the percent yield of the principal crop was 88.5%.

EXAMPLE IV

In Example IV, the same materials in identical amounts were used as in Example I, except that 149.5 g (1.155 moles) of bromochloromethane was employed instead of 200.8 g (1.155 moles) of dibromomethane, and that no 18-crown-6 was added to the reaction mixture in this Example IV. The addition of bromochloromethane to the ethylene glycol solution of the potassium salts of the aromatic hydroxyl compounds took 2 hours at up to 160° C. The mixture was cooled to room temperature overnight and was reheated on the next day to 160° C. for 1.5 hours. Then the mixture was cooled to 50° C. in an ice bath and precipitated in two 4-liter beakers, each containing 2 liters of ice water. After mixing well, pH was 7.0. The pale beige solid was collected by filtration, and filtrate was discarded. The solid had mp. range of 290°–315° C.

The solid was mixed with 2 liters of methanol in a Waring blender for 2 minutes and was again collected by filtration. Then the solid was divided into two approximately equal portions and each half was boiled for 1 hour in 2 liters of methanol in a 4-liter beaker on a hot plate, with magnetic stirring. The two beakers were cooled in an ice bath to 40° C., and the undissolved solid was collected from both beakers by filtration and was washed on the filter with 160 ml of acetone. The wet solid had mp. range of 268°–280° C.

When still wet, the undissolved solid weighed 910.0 g; after drying in an air oven for 9 hours at 83° C./1 atm absolute, 564.3 g; and after redrying in a vacuum oven for 4 hours at 160° C./267 Pa, absolute, 562.3 g. This product of Example IV was identified by means of IR and NMR spectra and other analytical results reported in Table 1, below, as the polymer having the structure of Formula X, with the average degree of polymerization n=5. The yield of the product was about 90% based on 2,2-bis(3,5-dibromo-4-hydroxyphenyl)propane.

EXAMPLE V

In Example V, the same materials in identical amounts were used as in Example I, except that 98.1 g (1.155 moles) of dichloromethane was used instead of 200.8 g (1.155 moles) of dibromomethane, and that 0.3 g (0.0011 mole) of 18-crown-6 was added to the reaction mixture, instead of 2.6 g (0.01 mole) of 18-crown-6 as in Example I. The reaction procedure was also the same in this Example V as in Example I, and very similar observations were made. The addition of dichloromethane to the ethylene glycol solution of the potassium salts of the aromatic hydroxyl compounds took 1.5 hours at 140° to 150° C. After cooling to room temperature overnight, to the reaction mixture was added 100 ml of ethylene glycol (to facilitate stirring mechanically), and the resulting mixture was gradually heated, with stirring, from 25° C. to 150° C. for 1 hour and then at 150° C. for 1 hour. At this time, the reaction was essentially complete, since the basic organic potassium salts had been consumed, and the reaction mixture was neutral (pH 7.0).

The reaction mixture was cooled in an ice bath to 30° C. and then precipitated in two 4-liter beakers, each of which contained 2 liters of ice water. The solid from both beakers was collected by filtration and washed in a Waring blender for 2 minutes with 1 liter of methanol at room temperature. The mixture was filtered, and the white solid on the filter was divided into two approximately equal portions. Each half of the white solid was boiled for 1 hour in a 4-liter beaker with 2 liters of methanol. The two beakers were cooled to near room temperature, and the undissolved white solid was collected from both beakers by filtration and was washed on the filter with 1 liter of acetone at room temperature. The undissolved white solid, while still wet, weighed 854.3 g; after drying for 3 hours at 130° C./267 Pa, absolute, in a vacuum oven and grinding to a white powder in a mortar, net weight, 490.1 g; mp. 275°–295° to a pale orange liquid.

The white powder was redried for another period of 3 hours at 160°° C./267 Pa, absolute, in the vacuum oven. The yield of this product in the drying dish was 514.9 g or 82.8%. The product was pulverized and bottled. The yield of product in the bottle was 489.0 g or 78.6%. Both yields are based on 1.0 mole of 2,2-bis(3,5-dibromo-4-hydroxyphenyl)propane. The product, a white powder, was identified as having the structure of Formula X (average n=5) by IR and NMR spectra and by other analyses listed in Table 1, below. The visual mp. 275°–295° C. did not change on redrying. For % Br and TGA analyses, the product was redried again for 6 hours at 140° C./133 Pa, absolute.

TABLE 1

Analytical Data, Besides IR and NMR Spectra, Obtained for the Products of Examples II–V

| | Product of Example Number | | | |
|---|---|---|---|---|
| | II | III | IV | V |
| Methylene dihalide used | $CH_2Br_2$ | $CH_2Cl_2$ | $CH_2BrCl$ | $CH_2Cl_2$ |
| Color of the Product | White | Pale Beige | Pale Beige | White |
| Calculated for Formula X (n = 5) or $C_{86}H_{63}Br_{23}O_{11}$: mol. wt. | 3110.4 | 3110.4 | 3110.4 | 3110.4 |
| Calculated, % Br | 59.09% | 59.09% | 59.09% | 59.09% |
| Found, % Br | 58.56; 58.53 | 58.24; 57.96 | 58.02; 58.12 | 59.59; 59.33 |
| Found, average % Br | 58.55% | 58.10% | 58.07% | 59.46% |
| % Purity, based on Br content | 99.1% | 98.3% | 98.3% | 99.4% |
| Found % OH by IR | 0.19% | 0.41% | 0.31% | 0.24% |
| Wt. % Ethylene glycol, based on gas chromatography | 0.13% | 0.11% | 0.20% | 0.08% |
| Molecular weight by liquid chromatography for the fraction soluble in p-dioxane: | | | | |
| $M_N$ | 1478 | 1855 | 1745 | 2015 |
| $M_W$ | 2158 | 2337 | 2062 | 2348 |
| $M_Z$ | 2789 | 2932 | 2515 | 2790 |
| Average degree of polymerization n for the total sample | 5 | 5 | 5 | 5 |
| Thermogravimetric analysis (TGA), at the heating rate of 10° C./minute in flowing $N_2$ atmosphere: | | | | |
| 5% wt. loss at | 369° C. | 372° C. | 367° C. | 357° C. |
| 10% wt. loss at | 381° C. | 381° C. | 376° C. | 367° C. |
| 20% wt. loss at | 388° C. | 387° C. | 382° C. | 374° C. |
| 40% wt. loss at | 393° C. | 391° C. | 387° C. | 378° C. |
| Visual mp., oil bath | 282°–298° C. | 250°–275° C. | 268°–280° C. | 275°–295° C. |
| Differential scanning calorimetry (DSC), mp. | 220° C. | 215° C. | 220° C. | 210° C. |
| DSC, major decomposition starts at | 350° C. | 340° C. | 335° C. | 340° C. |

EXAMPLE VI

Synthesis of hydroxyl-terminated and N-(tetrabromophthalimido)-terminated poly-(tetrabromobisphenol A formal)

To a 2-liter 1-neck flask were added at room temperaature 272.0 g (0.5 mole) of 2,2-bis(3,5-dibromo-4-hydroxyphenyl)propane, 600 ml of ethylene glycol, 100 ml of toluene, and 46.3 g (0.1 mole) of 4,5,6,7-tetrabromoisoindole-1,3-dione (or 3,4,5,6-tetrabromophthalimide, Aldrich Chemical Co. product No. 10,431-0). The yellow mixture was swirled around in the flask, and then 72.0 g of 85.7% potassium hydroxide was added (containing 61.7 g or 1.1 mole of pure KOH and 10.3 g of water) in seven about equal portions, swirling around the flask after each addition. As the KOH pellets dissolved, slight exotherm was observed, and the color of the mixture changed from yellow to creamy white. The flask was left at room temperature for 1 hour and then attached to a flash evaporator. At a reduced pressure, 100 ml of a colorless distillate containing water and toluene was distilled out of the flask on a hot oil bath. The distillation residue was transferred to a 2-liter 4-neck flask equipped with an electric heating mantle, a mechanical stirrer, a thermometer for the reaction mixture, an addition funnel, and a branched glass tube leading to a thermometer for the vapor temperature and to a vertical, water-cooled condenser topped by a CaSO$_4$ tube.

To the mixture was added 2.6 g (0.01 mole) of 18-crown-6 phase transfer catalyst, and the mixture was heated, with mechanical stirring, to 120° C. Starting at this temperature, 100.5 g (0.578 mole) of dibromomethane was added dropwise to the reaction mixture with continued external heating, in 1.25 hours. When about one half of the dibromomethane had been added, the reaction mixture became thicker as a precipitate was formed, and the pH was from 8.0 to 8.5, as determined with pH paper. At this time, 100 ml more of ethylene glycol was added, to facilitate stirring.

After complete addition of dibromomethane, the temperature reached 140° C.; pH 6 to 7. Then the mixture was heated for 1 hour to 150° C.; pH 6.0 to 6.5. The heating was stopped, the mixture was cooled with an external ice bath to 70° C., and then the main product of this Example IX was precipitated in 2 liters of ice water and collected by filtration. The light tan solid on the filter was washed with 500 ml of methanol. The first crop, a light beige powder, when wet, weighed 1192.0 g.

The methanol filtrate of the washings was added to the initial aqueous filtrate. The mixture was refiltered to obtain 7.0 g of a white solid after standing at room temperature, as the second crop.

The first crop weighed 743.0 g after air-drying at room temperature overnight for 16 hours, and its weight decreased to 344.3 g after drying in a vacuum oven at 120° C./667 Pa, absolute, for 6 hours. At this time, the first crop, a pale beige solid, melted in a capillary tube inserted in an oil bath at 287°–299° C.

The first crop was pulverized in a mortar to a fine, pale beige powder and dried for 4 more hours in the vacuum oven at the same conditions as before; the weight decreased to 332.0 g. Then the first crop was redried for 4 more hours in the vacuum oven at the same conditions as before; the final net weight was 325.7 g.

The theoretical yield for hydroxyl-terminated and N-(tetrabromophthalimido)-terminated pentakis(tetrabromobisphenol A formal) having the structure of Formula XI (n=5) and the empirical formula C$_{88}$H$_{61}$Br$_{24}$NO$_{12}$ was 0.1 mole or 324.2 g.

The actual yield of the first crop was 1.5 g over the theoretical indicating that some by-products and/or the reaction solvent (ethylene glycol) was retained in the product.

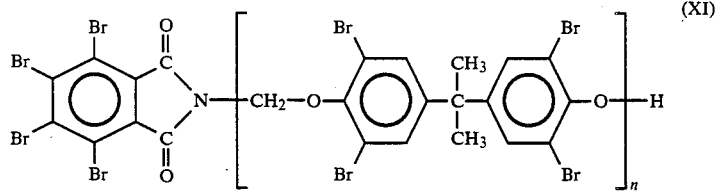
(XI)

The presence of at least 10% of a volatile impurity (mostly ethylene glycol) was also indicated by the thermogravimetric analysis (TGA), which showed, at the same conditions of heating rate as in the other examples, 5% of weight loss at 100° C.; 10% at 248° C.; 20% at 341° C.; and 40% at 354° C.

The infrared (IR) analysis indicated the presence of poly(tetrabromobisphenol A formal) with hydroxyl end group or groups and a trace of tetrabromophthalimide. The hydroxyl content in methylene chloride solution, by means of IR, indicated 0.43% of OH for the soluble fraction in this solvent.

For the fraction soluble in p-dioxane, the following molecular weight observations were made by liquid chromatography (LC): M$_N$, 1321; M$_W$, 1832; and M$_Z$, 2572.

The bromine analyses were as follows: Calculated for Formula XI (n=5): Br, 59.15%. Found: Br, 52.21%, 52.58%; average Br, found, 52.40%.

The bromine analyses indicated the purity of 88.6% by bromine content, which corresponded to the presence of about 11.4% by weight of solvents (principally ethylene glycol, as the least volatile solvent). This result was in general agreement with the above mentioned TGA result of at least 10% of volatiles present.

EXAMPLE VII

Synthesis of 2-methyl-3,4,5,6-tetrabromophenoxy-terminated and OH—terminated poly(tetrabromobisphenol A acetal).

To a 2-liter 1-neck flask were added at room temperature 204.0 g (0.375 mole) of 2,2-bis(3,5-dibromo-4-hydroxyphenyl)propane, 106.0 g (0.25 mole) of 2-methyl-3,4,5,6-tetrabromophenol, 600 ml of ethylene glycol, 100 ml of toluene, and 65.5 g of 85.7% potassium hydroxide (containing 56.1 g or 1.0 mole of pure KOH and 9.4 g of water). At a reduced pressure on a flash evaporator, 100 ml of toluene and water were removed by distillation. The residual, pale yellow liquid was transferred to a 2-liter 4-neck flask using 100 ml of ethylene glycol, preheated to about 100° C., to ensure a quantitative transfer. A second portion of 3.0 g of 85.7% potassium hydroxide (containing 2.57 g or 0.046 mole or pure KOH and 0.43 g of water) was also added to the 2-liter 4-neck flask, which was equipped by the same apparatus as the 2-liter 4-neck flask in Example VI.

The mixture in the flask was heated externally, with mechanically stirring, to 130° C. At this temperature, the dropwise addition of 95.0 g (0.5057 mole) of 1,1-dibromoethane was started from an addition funnel to the dark amber colored reaction mixture. After about 25 g of 1,1-dibromoethane was added, its addition was temporarily stopped, and 0.3 g (0.001135 mole) of 18-crown-6 was added to the reaction mixture. No exotherm was observed. External heating was resumed, and the rest of 1,1-dibromoethane was added at 140°–150° C.

The total time of addition was 1.5 hours. The reaction mixture acquired a dark brown color during the addition. Then it was heated, with some reflux, at 150° C. for 2 hours after addition, cooled to 50° C., and filtered. The light brown solid product on the filter was washed with 100 ml of absolute methanol. The wet weight of the first solid crop was 18.6 g. A small sample was removed for infrared analysis which supported the structure of hydroxyl terminated and 2-methyl-3,4,5,6-tetrabromophenoxy-terminated poly(tetrabromobisphenol A acetal) as shown in Formula XII.

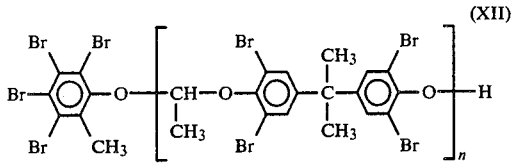

(XII)

The rest of the sample was dried in the air, whereupon some hydrolytic reaction with air moisture took place, so that after the drying period of 64 hours, the sample (8.8 g) appeared to contain an inorganic salt and tetrabromobisphenol A as the principal ingredients.

A second crop was produced by pouring the filtrate of the first crop and the methanol washings into 2 liters of ice water, followed by a decantation of the upper layer of mainly water, ethylene glycol, and methanol, and recrystallization of the lower layer, an oily solid, from 1 liter of acetone. After the evaporation of acetone, the residual light brown solid had mp. 83°–95° C. After complete air-drying at 83° C. for 64 hours, the yield of the second crop was 229.0 g.

As indicated by NMR and IR spectra, the precipitation in water had largely hydrolyzed the product of the initial composition shown by Formula XII to 2,2-bis(3,5-dibromo-4-hydroxyphenyl)propane and to 2-methyl-3,4,5,6-tetrabromophenol.

EXAMPLE VIII

To a 5-liter 4-neck flask equipped with a mechanical stirrer; a Dean-Stark trap for distillation of volatiles topped by a vertical, water-cooled condenser and a dry calcium sulfate tube; a thermometer; an addition funnel; and an electric heating mantle, were added 815.8 g (1.5 moles) of 2,2-bis(3,5-dibromo-4-hydroxyphenyl)propane, 2000 ml of diethylene glycol, and 414.6 g (3.0 moles) of potassium carbonate. The tan-colored mixture was heated with stirring to 140° C., whereupon a homogeneous, clear orange solution was formed. During this reaction, while the dipotassium salt of 2,2-bis(3,5-dibromo-4-hydroxyphenyl)propane was formed, a large amount of gaseous carbon dioxide was evolved. To the reaction mixture was added 200 ml of xylene. A Dean-Stark trap was attached below the vertical, water-cooled condenser. Through this trap, 92 ml of a distillate was removed, consisting of two phases. The upper phase contained 72 ml of xylene, and the lower phase contained 20 ml of water. The reaction mixture was cooled from 140° C. to below 68° C. in an ice water bath. To the reaction mixture were added 388.2 g (3.0 moles) of bromochloromethane and 2.6 g (0.01 mole) of 18-crown-6. The mixture was heated to reflux at 125° C. for one hour, whereupon it became white and very viscous.

To a 2-liter Erlenmeyer flask were added 992.4 g (3.0 moles) of 2,4,6-tribromophenol, 1500 ml of diethylene glycol, and 414.6 g (3.0 moles) of potassium carbonate. The mixture in the Erlenmeyer flask was stirred and a green solution of potassium salt of 2,4,6-tribromophenol was formed, while gaseous carbon dioxide evolved. After three hours, most of the solids dissolved, and the solution acquired a red color. Ten percent by volume of this solution (220 ml) containing 0.3 mole of potassium 2,4,6-tribromophenate in diethylene glycol solution was removed from Erlenmeyer flask, mixed in a one-liter 1-neck flask with 200 ml of xylene, and subjected to distillation at a reduced pressure on a flask evaporator until the distillation of an azeotrope of water and xylene followed by xylene alone was complete. The residue of this distillation was added to the 5-liter 4-neck flask and the resulting mixture was heated for 3 hours to 120° C. Then the mixture was allowed to cool to 25° C. overnight.

On the next day, the mixture in the 5-liter, 4-neck flask was heated to 50° C. with stirring, and a 15 ml aliquot was removed by a pipet and filtered. The white solid on the filter was washed twice with the total of 50 ml of methanol in two equal portions. The filtrate containing methanol washings and diethylene glycol was mixed with an equal amount of water and acidified with aqueous hydrochloric acid to pH2. No filterable solids were formed, and the filtrate was discarded.

The white solid obtained from the aliquot which was insoluble in methanol, was dried for 20 minutes at 80° C. in an air oven to yield 3.3 g of a white solid, mp. 301°–306° C.

The principal reaction mixture was heated for four hours at 137° C., whereupon the stirring became easier, to 145° C., and finally up to 160° C., at which time a tan color appeared in the mixture. The reaction mixture, while still hot, was filtered. The solid on the filter was suspended in a 4-liter beaker in 2 liters of methanol, mixed well, and filtered.

This procedure was repeated by removing the solid from the filter, suspending in 2 liters of methanol, stirring well and filtering. The white solid obtained in this manner was insoluble in hot diethylene glycol and insoluble in methanol. It weighed 1949.5 g when wet with methanol and 1181.3 g after drying in an air oven at 90° C. overnight for 16 hours.

This white solid was pulverized in a mortar to a white powder, sieved and redried in a vacuum oven at 140° C. for 20 hours at about 2.7 kPa, absolute. The yield was 1118.9 g, and the white powder had mp. 300°–307° C. It was analyzed as follows:

By thermogravimetric analysis (TGA), 1% weight loss at 48° C.; 5% at 297° C.

By differential scanning calorimetry (DSC), decomposition of the product was observed to start 325° C.

The white powder was redried for 8 hours at 150° C./2.7 kPa absolute, in a vacuum oven and a sample was analyzed as follows: By TGA at the heating rate of 10° C./minute in a flowing nitrogen atmosphere, 1% weight loss at 178° C.; 5% at 350° C.; 8% at 385° C. The infrared spectrum supported the structure of 2,4,6-tribromophenoxy and hydroxyl terminated poly(tetrabromobisphenol A formal) having the formula X. Because of insolubility, the determination of the average molecular weight by liquid chromatography, of %OH by the IR spectrum, and of the NMR spectrum was impossible. The found bromine content was: 54.26%; 54.12%; average Br, 54.19%. The chlorine content was 2.13%; 2.34%, average Cl, 2.23%.

The redried white powder was suspended in 2 liters of distilled water, mixed well, filtered, the solid on the filter was suspended in a 4-liter beaker in 2 liters of methanol, filtered again, and the solid on the filter was dried in an air oven for 16 hours at 120° C., pulverized, and redried for 2 hours at 150° C./2.7 kPa, absolute, in a vacuum oven. The resulting product was a white powder weighing 930.0 g. It was analyzed as follows: By TGA at the same conditions as before, 1% weight loss at 249° C.; 5% at 373° C.; 8% at 383° C. Bromine content was analyzed as follows: 57.75%, 57.33%; average Br, 57.54%.

Calculated for poly(tetrabromobisphenol A formal) or $(C_{16}H_{12}Br_4O_2)_n$: Br, 57.50%.

Based on this formula, the purity of the product, according to the Br content, was 99.93%.

In each of Examples IX–XI a series of compositions, each containing an additive to be evaluated, antimony trioxide and polymer, was tested for fire retardance. For each of the compositions tested, polymer was introduced into a mixer and melted. A mixture of the additive to be evaluated and antimony trioxide was added to the melt and the materials were mixed until uniform to produce the composition. After cooling, each composition was heat pressed into sheets which were cut into bars. The bars were tested for flammability in accordance with the procedure of Vertical Burning Test 94, dated Feb. 1, 1974, of Underwriters Laboratories, Inc. (UL-94 test), and in some cases, also in accordance with Standard Method of Test for Flammability of Plastics Using the Oxygen Index Method, ASTM Standard Method D 2863-70, American Society for Testing and Materials. For each composition tested in the UL-94 test, five bars are each ignited twice so that the UL-94 test results (V-0, V-1, V-2, After Flame Time) are the average results from ten ignitions with five bars. The polymers are abbreviated according to the following key:

ABS=acrylonitrile-butadiene-styrene graft polymer
HIPS=high impact polystyrene
PP=polypropylene
HDPE=high density polyethylene
PBT=glass filled poly(butylene terephthalate); 30% glass fibers, 70% resin, by weight.
NYL=poly($\epsilon$-caprolactam)
XLPE=crosslinked polyethylene

EXAMPLE IX

The additive to be evaluated was the product of Example II. The identities of the polymers, the proportions of materials and the results are shown in Table 2.

TABLE 2

| | Proportions, parts by weight | | | Vertical Burning Test UL 94 | |
|---|---|---|---|---|---|
| Polymer | Polymer | Additive | Antimony Trioxide | Classification | After Flame Time, seconds |
| ABS | 78.0 | 18.4 | 3.6 | V-0 | 0 |
| HIPS | 100 | 12 | 4 | Fail | >30 |
| PP | 100 | 5 | 2.5 | Fail | >30 |
| HDPE | 100 | 9.7 | 2.9 | V-2 | 10.0 |
| PBT | 100* | 12 | 3 | V-0 | 0.3 |
| NYL | 77.5 | 18.0 | 4.5 | V-2 | 2.0 |
| XLPE | 63 | 26.25 | 8.75** | V-1 | 2.9 |

*70 parts resin plus 30 parts glass fibers.
**The test composition also contained 2 parts by weight VUL-CUP ® Peroxide Catalyst (Hercules, Inc.) which comprised 40% by weight α,α'-bis(tert-butylperoxy) diisopropylbenzene and 60% by weight Burgess KE clay as an inert carrier.

EXAMPLE X

The additive to be evaluated was the product of Example VIII and the polymer was NYL. Test bar thicknesses were 1.6 millimeters. The proportions of materials and the results are shown in Table 3.

TABLE 3

| Proportions, parts by weight | | | Vertical Burning Test UL 94 | |
|---|---|---|---|---|
| Polymer | Additive | Antimony Trioxide | Classification | After Flame Time, seconds |
| 100 | 30.4 | 7.6 | V-0 | 0.2 |
| 100 | 23.2 | 5.8 | V-0 | 0.3 |

EXAMPLE XI

A series of compositions, each containing poly($\epsilon$-caprolactam), the product of Example VIII, and optionally antimony trioxide, was tested for fire retardance. For each of the compositions tested, polymer was introduced into a mixer and melted. A mixture of the additive to be evaluated and antimony trioxide (when present) was added to the melt and the materials were mixed until uniform to produce the composition. After cooling, each composition was chopped into small pieces and extruded into 3.2 millimeter pellets. The pellets were injection molded into bars. The bars were tested for flammability in accordance with the procedure of Vertical Burning Test 94, dated Feb. 1, 1974, of Underwriters Laboratories, Inc., and in accordance with Standard Method of Test for Flammability of Plastics Using the Oxygen Index Method, ASTM Standard Method D 2863-70, American Society for Testing and Materials. The proportions of materials and the results are shown in Table 4.

TABLE 4

| Proportions, parts by weight | | | Vertical Burning Test UL 94 | |
|---|---|---|---|---|
| Polymer | Additive | Antimony Trioxide | Classification | After Flame Time, seconds |
| 77.5 | 16.9 | 5.6 | V-0 | 0.5 |
| 77.5 | 18 | 4.5 | V-0 | 0.5 |
| 77.5 | 18.75 | 3.75 | V-0 | 0.2 |
| 80 | 15 | 5 | V-2 | 2.7 |
| 80 | 16 | 4 | V-2 | 2.2 |
| 80 | 16.7 | 3.3 | V-0 | 1.0 |
| 80 | 17.1 | 2.9 | V-0 | 0.1 |
| 82.5 | 14.6 | 2.9 | V-2 | 2.1 |
| 82.5 | 15 | 2.5 | V-2 | 2.9 |
| 82.5 | 17.5 | 0 | Fail | >30 |

Although the present invention has been described with reference to specific details of certain embodiments thereof, it is not intended that such details should be regarded as limitations upon the scope of the invention except insofar as they are included in the accompanying claims.

I claim:

1. Acetal and/or ketal polymer diagrammatically represented by the formula:

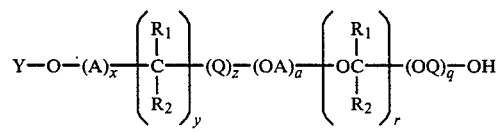

wherein
a. each A is individually a divalent aromatic group containing either one aromatic ring substituted by at least two bromo groups or two aromatic rings which are either joined together or separated by an atom, each of said rings being substituted by at least two bromo groups,
b. each $R_1$ is individually hydrogen, unsubstituted alkyl, substituted alkyl, unsubstituted phenyl, or substituted phenyl,
c. each $R_2$ is individually hydrogen, unsubstituted alkyl, substituted alkyl, unsubstituted phenyl, or substituted phenyl,
d. each Q is individually a divalent orango group other than A having at least two carbon atoms between the two valences thereof,
e. Y of each molecule of said polymer is or a bromo substituted monovalent organo group,
f. the average value of each x, y and z is in the range of from 0 to 1,
g. the sum of the average values of a and x is in the range of from 2 to about 30,
h. the sum of the average values of r and y is in the range of from 1 to about 30,
i. the sum of the average values of q and z is in the range of from 0 to about 5,
provided that
j. the sum of the average values of x, y and z is 1,
k. the sum of the average values of a and x is greater than the sum of the average values of r and y, and
l. the sum of the average values of a and x is greater than or equal to the sum of the average values of q and z.

2. The acetal and/or ketal polymer of claim 1 wherein A is (1-methyl-ethylidene)bis(2,6-dibromo-4,1-phenylene).

3. The acetal and/or ketal polymer of claim 1 wherein A is tetrabromo-1,4-phenylene.

4. The acetal and/or ketal polymer of claim 1 wherein each $R_1$ is individually hydrogen, unsubstituted alkyl containing from 1 to about 6 carbon atoms, substituted alkyl containing from 1 to about 6 carbon atoms, unsubstituted phenyl, or substituted phenyl, and wherein each $R_2$ is individually hydrogen, unsubstituted alkyl containing from 1 to about 6 carbon atoms, substituted alkyl containing from 1 to about 6 carbon atoms, unsubstituted phenyl or substituted phenyl.

5. The acetal and/or ketal polymer of claim 1 wherein each $R_1$ is individually hydrogen, unsubstituted alkyl or unsubstituted phenyl, and wherein each $R_2$ is individually hydrogen, unsubstituted alkyl or unsubstituted phenyl.

6. The acetal and/or ketal polymer of claim 1 wherein each $R_1$ is individually hydrogen, unsubstituted alkyl containing from 1 to about 6 carbon atoms, or unsubstituted phenyl, and wherein each $R_2$ is individually hydrogen, unsubstituted alkyl containing from 1 to about 6 carbon atoms, or unsubstituted phenyl.

7. The acetal and/or ketal polymer of claim 1 wherein $R_1$ is hydrogen or methyl and wherein $R_2$ is hydrogen or methyl.

8. The acetal and/or ketal polymer of claim 1 wherein $R_1$ and $R_2$ are each hydrogen.

9. The acetal and/or ketal polymer of claim 1 wherein Y of each molecule of said polymer is 2,4,6-tribromophenyl.

10. Acetal and/or ketal polymer diagrammatically represented by the formula:

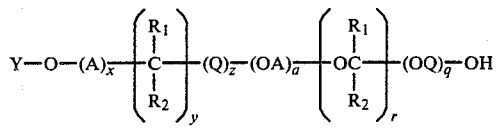

wherein
a. each A is individually a divalent aromatic group containing either one aromatic ring substituted by at least two bromo groups or two aromatic rings which are either joined together or separated by an atom, each of said rings being substituted by at least two bromo groups,
b. each $R_1$ is individually hydrogen, unsubstituted alkyl, substituted alkyl, unsubstituted phenyl, or substituted phenyl,
c. each $R_2$ is individually hydrogen, unsubstituted alkyl, substituted alkyl, unsubstituted phenyl, or substituted phenyl,
d. each Q is individually a divalent organo group other than A having at least two carbon atoms between the two valences thereof,
e. Y of each molecule of said polymer is a bromo-substituted monovalent organo group,
f. the average value of each of x, y and z is in the range of from 0 to 1,
g. the sum of the average values of a and x is in the range of from 2 to about 6,
h. the sum of the average values of r and y is in the range of from 1 to about 6,
i. the sum of the average values of q and z is in the range of from 0 to about 6,
provided that
j. the sum of the average values of x, y and z is 1,
k. the sum of the average values of a and x is greater than the sum of the average values of r and y, and
l. the sum of the average values of a and x is greater than or equal to the sum of the average values of q and z.

11. The acetal and/or ketal polymer of claim 10 wherein Y is pentabromophenyl, 2,4,6-tribromophenyl, 2-methyl-3,4,5,6-tetrabromophenyl, 3-methyl-2,4,5,6-tetrabromophenyl, 4-methyl-2,3,5,6-tetrabromophenyl, tetrabromo-1-naphthyl, pentabromo-1-naphthyl, hexabromo-1-naphthyl, tetrabromo-2-naphthyl, pentabromo-2-naphthyl, or hexabromo-2-naphthyl.

12. The acetal and/or ketal polymer of claim 23 wherein the sum of the average values of q and z is essentially zero.

13. The acetal and/or ketal polymer of claim 1 having a number average molecular weight in the range of from about 1000 to about 10,000.

14. The acetal and/or ketal polymer of claim 1 having a number average molecular weight in the range of from about 1000 to about 30,000.

15. The acetal and/or ketal polymer of claim 1 wherein
a. A is (1-methylethylidene)bis(2,6-dibromo-4,1-phenylene),
b. $R_1$ and $R_2$ are each hydrogen,
c. Y of each molecule of said polymer is or 2,4,6-tribromophenyl, and
d. the sum of the average values of q and z is essentially zero.

16. The acetal and/or ketal polymer of claim 1 wherein Y is pentabromophenyl, 2,4,6-tribromophenyl, 2-methyl-3,4,5,6-tetrabromophenyl, 3-methyl-2,4,5,6- tetrabromophenyl, 4-methyl-2,3,5,6-tetrabromophenyl, tetrabromo-1-naphthyl, pentabromo-1-naphthyl, hexabromo-1-naphthyl, tetrabromo-2-naphthyl, pentabromo-2-naphthyl, or hexabromo-2-naphthyl.

17. A composition of matter comprising acetal and/or ketal polymer diagrammatically represented by the formula

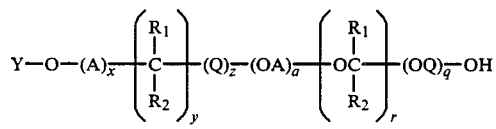

wherein
a. each A is individually a divalent aromatic group containing either one aromatic ring substituted by at least two bromo groups or two aromatic rings which are either joined together or separated by an atom, each of said rings being substituted by at least two bromo groups,
b. each $R_1$ is individually hydrogen, unsubstituted alkyl, substituted alkyl, unsubstituted phenyl, or substituted phenyl,
c. each $R_2$ is individually hydrogen, unsubstituted alkyl, substituted alkyl, unsubstituted phenyl, or substituted phenyl,
d. each Q is individually a divalent organo group other than A having at least two carbon atoms between the two valences thereof,
e. Y of each molecule of said polymer is a bromo substituted monovalent organo group,
f. the average value of each of x, y, and z is in the range of from 0 to 1,
g. the sum of the average values of a and x is in the range of from 2 to about 30,
h. the sum of the average values of r and y is in the range of from 1 to about 30,
i. the sum of the average values of q and z is in the range of from 0 to about 5,
provided that
j. the sum of the average values of x, y, and z is 1,
k. the sum of the average values of a and x is greater than the sum of the average values of r and y, and
l. the sum of the average values of a and x is greater than or equal to the sum of the average values of q and z, in admixture with other polymer.

18. The composition of claim 17 wherein said other polymer comprises acrylonitrile-butadiene-styrene interpolymer, acrylonitrile-butadiene-styrene graft polymer, polystyrene, high density polyethylene, low density polyethylene, crosslinked polyethylene, polypropylene, polyester, polycarbonate, or polyamide.

19. The composition of claim 17 wherein said acetal and/or ketal polymer is present in an amount in the range of from about 1 percent to about 50 percent by weight of the total polymeric content of said composition.

20. The composition of claim 17 further comprising antimony trioxide.

21. The composition of claim 17 wherein
a. A is (1-methylethylidene)bis(2,6-dibromo-4,1-phenylene),
b. $R_1$ and $R_2$ are each hydrogen,
c. Y of each molecule of said acetal and/or ketal polymer is 2,4,6-tribromophenyl, and
d. the sum of the average of q and z is essentially zero.

22. The composition of claim 17 wherein Y is pentabromophenyl, 2,4,6-tribromophenyl, 2-methyl-3,4,5,6-tetrabromophenyl, 3-methyl-2,4,5,6-tetrabromophenyl, 4-methyl-2,3,5,6-tetrabromophenyl, tetrabromo-1-naphthyl, pentabromo-1-naphthyl, hexabromo-1-naphthyl, tetrabromo-2-naphthyl, pentabromo-2-naphthyl, or hexabromo-2-naphthyl.

* * * * *